(12) United States Patent
Kienle et al.

(10) Patent No.: US 12,544,005 B2
(45) Date of Patent: Feb. 10, 2026

(54) METHOD FOR DETECTING DEMINERALIZATION OF TOOTH SUBSTANCE

(71) Applicant: Ivoclar Vivadent AG, Schaan (LI)

(72) Inventors: Alwin Kienle, Blaustein (DE); Steffen Nothelfer, Nersingen (DE)

(73) Assignee: Ivoclar Vivadent AG, Schaan (LI)

( * ) Notice: Subject to any disclaimer, the term of this patent is extended or adjusted under 35 U.S.C. 154(b) by 542 days.

(21) Appl. No.: 17/740,996

(22) Filed: May 10, 2022

(65) Prior Publication Data

US 2022/0361806 A1 Nov. 17, 2022

(30) Foreign Application Priority Data

May 12, 2021 (EP) ..................................... 21173564

(51) Int. Cl.
*A61B 5/00* (2006.01)
*A61B 1/06* (2006.01)
(Continued)

(52) U.S. Cl.
CPC .......... *A61B 5/4547* (2013.01); *A61B 5/0075* (2013.01); *A61B 5/0088* (2013.01);
(Continued)

(58) Field of Classification Search
CPC ... A61B 5/4547; A61B 5/0075; A61B 5/0088; A61B 5/1077; A61B 5/1079; A61B 5/4538; A61B 5/4542; A61B 5/0071; A61B 5/0059; A61B 5/0093; A61B 5/1455; A61B 5/02416; A61B 5/0261; A61B 5/107; A61B 1/06; A61B 1/00009; A61B 2576/00; A61B 6/52; A61C 9/006; A61C 9/004; A61C 9/0046; A61C 9/0053; G01B 11/24; G01B 11/2527; G03B 35/08; G16H 30/40; G06T 2207/30036
(Continued)

(56) References Cited

U.S. PATENT DOCUMENTS 9,314,150 B2 4/2016 Chen et al.
10,463,256 B2 11/2019 Kanick et al.
(Continued)

FOREIGN PATENT DOCUMENTS

WO  WO-2019055569 A1 * 3/2019  ............... A61B 1/07
WO  WO-2021084023 A1 * 5/2021  ........... A61B 5/0075

OTHER PUBLICATIONS

Srinivasan V et al, "Automated Phase-Measuring Profilometry of 3-D Diffuse Objects", New York Institute of Technology, Center of Optics, Lasers and Holography. (Year: 1984).*

(Continued)

*Primary Examiner* — Eric J Rosen
*Assistant Examiner* — Mirayda A Aponte
(74) *Attorney, Agent, or Firm* — Ann M. Knab; Thad McMurray

(57) ABSTRACT

A method for detecting demineralization of a tooth substance, including the steps of irradiating (S101) a structured light pattern onto the tooth substance; detecting (S102) a light intensity of the light pattern remitted from the volume of the tooth substance; and determining (S103) demineralization of the tooth substance based on the detected light intensity.

10 Claims, 4 Drawing Sheets

(51) Int. Cl.
  *A61B 5/107* (2006.01)
  *A61C 9/00* (2006.01)
  *G01B 11/24* (2006.01)
  *G01B 11/25* (2006.01)
  *G03B 35/08* (2021.01)
  *G16H 30/40* (2018.01)

(52) U.S. Cl.
  CPC .......... *A61B 5/1077* (2013.01); *A61B 5/1079* (2013.01); *A61C 9/006* (2013.01); *G01B 11/24* (2013.01); *G01B 11/2527* (2013.01); *G03B 35/08* (2013.01); *A61B 1/06* (2013.01); *A61B 2576/00* (2013.01); *G06T 2207/30036* (2013.01); *G16H 30/40* (2018.01)

(58) Field of Classification Search
  USPC ....................................................... 433/215
  See application file for complete search history.

(56) References Cited

U.S. PATENT DOCUMENTS

2016/0302669 A1   10/2016   Cuccia
2017/0319057 A1*  11/2017   Inglese .............. A61B 1/00009
2019/0117078 A1    4/2019   Sharma et al.

OTHER PUBLICATIONS

Srinivasan, V. et al., "Automated Phase-Measuring Profilometry of 3-D Diffuse Objects," Journal of Applied Optics, vol. 23, No. 18, pp. 3105-3108, Sep. 15, 1984. New York, USA.
Webb, S. E. D., et al., "Wavelength-Resolved 3-Dimensional Fluorescence Lifetime Imaging," Journal of Fluorescence, vol. 12, No. 2, pp. 279-283, Jun. 2002. Plenum Publishing Corporation.

* cited by examiner

METHOD FOR DETECTING DEMINERALIZATION OF TOOTH SUBSTANCE

CROSS-REFERENCE TO RELATED APPLICATIONS

This application claims priority to European Patent Application No. 21173564.2 filed on May 12, 2021, the disclosure of which is incorporated herein by reference in its entirety.

TECHNICAL FIELD

The present invention relates to an optical method for detecting demineralization of a tooth substance and a dental device for detecting demineralization of a tooth substance.

BACKGROUND

Currently, caries is determined either purely visually or using technical aids, such as radiographs or autofluorescence of carious lesions. Visual detection of caries depends on the experience of the treating dentist and is therefore not ideal or objectively quantifiable in terms of standardization or quality assurance. In addition, it is not possible to quantify discoloration of teeth at an early stage on the basis of documentation.

US 20170319057, 20190117078, and 9314150 are directed to optical systems and methods for examining a tooth and are hereby incorporated by reference in their entirety. U.S. Ser. No. 10/463,256 and 20160302669 are directed to systems and methods for determining light scattering in biological tissue and are hereby incorporated by reference in their entirety.

SUMMARY

It is the technical aim of the present invention to determine areas of a tooth structure that are affected by demineralization, such as those that may occur in a dental caries.

This technical problem is solved by objects according to the independent claims. Technically advantageous embodiments are the subject of the dependent claims, the description and the drawings.

According to a first aspect, the technical problem is solved by a method for detecting demineralization of a tooth substance, comprising the steps of irradiating a structured light pattern onto the tooth substance; detecting a light intensity of the light pattern and/or intensity amplitude remitted from the volume of the tooth substance; detecting a light intensity of the light pattern remitted from the volume of the tooth substance; and determining a demineralization of the tooth substance based on the detected light intensity. By the method, early imaging of morphological or chemical changes in the tooth substance can be achieved. Additionally, demodulation of intensity amplitude and/or phase can be performed. In the method, light intensity reflected from the tooth surface can additionally be detected. Using the method, demineralization can be made objectifiable and quantifiable and occurs earlier and more sensitively. In addition, a depth sensitivity is achieved by which the demineralization can be determined in the volume of the tooth substance. The comparability and standardization of data sets obtained makes it possible to quantify the examination of initial caries. This can be documented in an objective manner.

In a technically advantageous embodiment of the method, a fluorescence transition of the remitted light intensity and/or an elastic scattering of the remitted light intensity is detected. A fluorescence transition of the reflected light intensity and/or an elastic scattering of the reflected light intensity can also be detected. This achieves, for example, the technical advantage that demineralization can be detected with high precision.

In another technically advantageous embodiment of the method, the irradiated structured light pattern has a stripe pattern, a dot pattern or a grid pattern and/or a periodic structure. This has the technical advantage, for example, that changes in the tooth substance can be detected quickly and accurately.

In another technically advantageous embodiment of the method, several structured light patterns with different spatial frequencies are irradiated onto the tooth substance. This has the technical advantage, for example, that by optimizing the spatial frequency of the irradiated light pattern, such as a sinusoidal pattern, the sensitivity to the depth range to be measured can be maximized and a depth resolution can be achieved.

In another technically advantageous embodiment of the method, several structured light patterns, each with a different light wavelength, are irradiated onto the tooth substance. This has the technical advantage, for example, that data on demineralization can be obtained from different depths of the tooth substance and additional information on the morphology can be determined.

In another technically advantageous embodiment of the method, the demineralization of the tooth substance is additionally determined on the basis of a phase shift between the irradiated light pattern and the remitted light pattern. The demineralization of the tooth substance can also be determined on the basis of a phase shift between the irradiated light pattern and the reflected light pattern. This has the technical advantage, for example, that the demineralization can be determined even more precisely.

In another technically advantageous embodiment of the method, the intensity amplitude and phase shift are determined with spatial resolution over a surface area and the demineralization is quantified with spatial resolution or using spatially resolved spectroscopy or determined on the basis of the surface area. This achieves, for example, the technical advantage that the demineralization can be determined more robustly, in particular over a surface of the tooth substance.

In another technically advantageous embodiment of the method, the demineralization and its layer thickness are determined on the basis of the detected light intensity using a model. The demineralization or a layer thickness can be determined in a model-based manner on the basis of the detected light intensity using analytical equations of the radiation transport theory for, for example, layered geometries. This provides, for example, the technical advantage of obtaining a quantitative and thus comparable quantity for characterizing the demineralization.

In a further technically advantageous embodiment of the method, the angle between a direction in which the light pattern is irradiated and a direction in which the light intensity of the light pattern is detected is between 0° and 45°. This achieves, for example, the technical advantage that demineralization can be detected particularly well, for example by avoiding or reducing reflections from surfaces.

In another technically advantageous embodiment of the method, a spatial geometry of the tooth substance is additionally determined on the basis of the reflected and/or remitted light pattern. This has the technical advantage, for example, that the spatial shape of the tooth or tooth substance can also be detected.

In another technically advantageous embodiment of the method, the spatial geometry of the tooth substance is determined on the basis of a model from several reflected and/or remitted light patterns, each with a different spatial frequency. The determined spatial geometry can be used to quantify the demineralization of the tooth substance more precisely. This has the technical advantage, for example, of increasing the accuracy of the detection of the spatial shape.

According to a second aspect, the technical problem is solved by a dental device for detecting a demineralization of a tooth substance, comprising a projection means for irradiating a structured light pattern onto the tooth substance; a detection means for detecting a light intensity of the light pattern and/or intensity amplitude remitted from the volume of the tooth substance; and a controller or determination means for determining a demineralization of the tooth substance based on the detected light intensity. Additionally, the detecting device may be adapted to detect a light intensity of the light pattern reflected from the surface.

In a technically advantageous embodiment of the dental device, the projection device comprises a digital projector with a multispectral radiation source. This provides the technical advantage, for example, that light patterns with different structures or light patterns with spatially resolved, arbitrarily variable intensity of different light wavelengths can be irradiated.

In another technically advantageous embodiment of the dental device, the detection device comprises an electronic camera. This achieves the technical advantage, for example, that the light pattern can be captured digitally quickly and efficiently.

In another technically advantageous embodiment of the dental device, the controller or determination device is designed to determine a spatial geometry of the tooth substance based on the remitted and/or reflected light pattern. This achieves the technical advantage, for example, that the spatial shape of the tooth or tooth substance can additionally be detected.

In an embodiment of the dental device, a computer program product includes program code which is stored on a non-transitory machine-readable medium, the machine-readable medium comprising computer instructions executable by a processor, which computer instructions cause the processor to perform the methods described herein, to determine demineralization of a tooth substance.

BRIEF DESCRIPTION OF THE DRAWINGS

The invention in the following will be described in detail by referring to exemplary embodiments that are accompanied by figures, in which.

DETAILED DESCRIPTION

Figure 1:
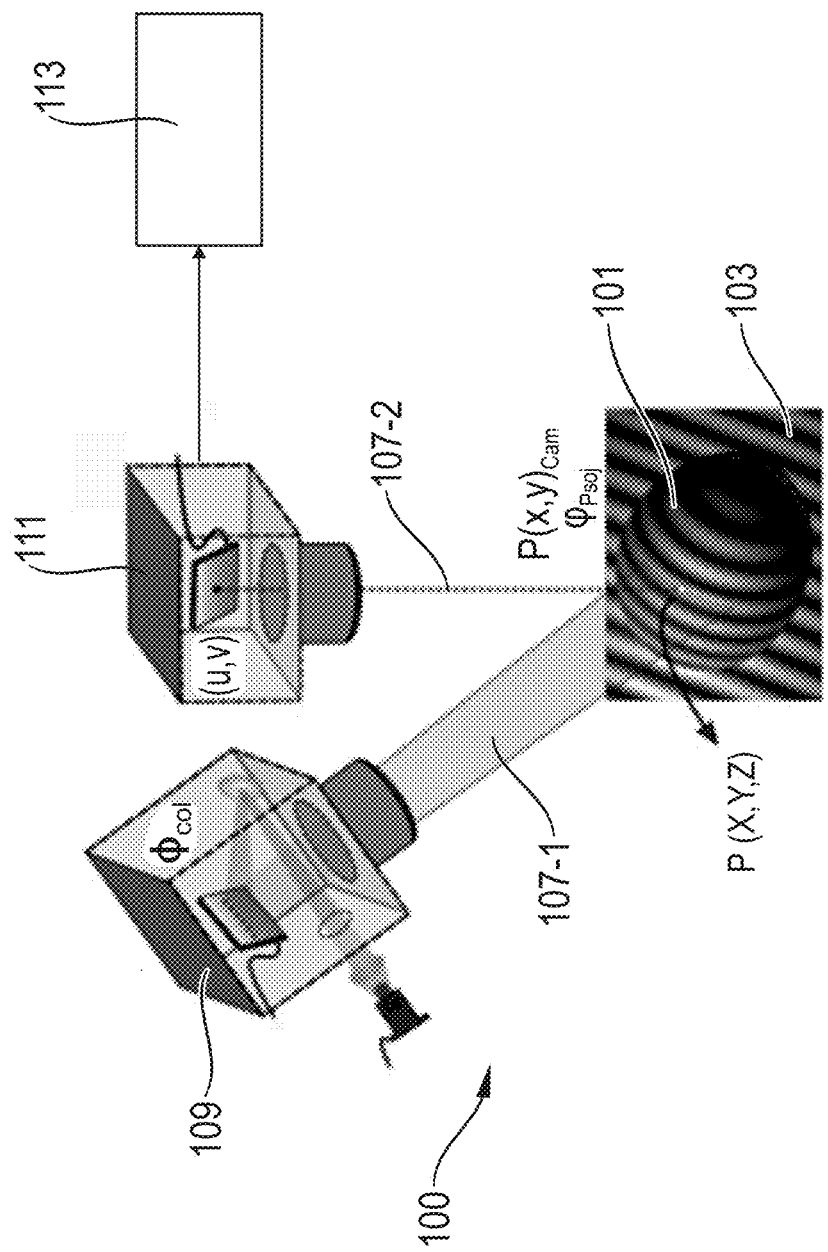
FIG. 1 shows a schematic view of a dental appliance.

FIG. 1 shows a schematic view of a dental device 100. The dental device 100 serves for detecting a demineralization of a tooth substance 101 of a tooth. The dental device 100 comprises a projection device 109 for irradiating a structured light pattern 103 onto the tooth substance 101. The projection device 109 is formed, for example, by a liquid crystal projector or a digital light processing (DLP) projector with a digital micromirror device (DMD).

Using suitable optics and a light source, light patterns of any color with any structure can be projected onto the tooth substance 101, such as but not limited to, a stripe pattern, a dot pattern or a grid pattern. The light pattern 103 may have a changeable periodic structure. In general, however, other suitably structured light patterns 101 may also be used.

In addition, the light patterns can be changed so that several structured light patterns with different spatial frequencies or different light wavelengths can be successively irradiated onto the tooth substance 101. Multispectral illumination can increase the robustness of the method. Since the magnitudes of structural changes in the tooth substance 101 are initially small in the case of initial caries, it is advantageous to use a small light wavelength, i.e. blue light, for example, in order to achieve the highest possible sensitivity.

The structured light pattern 103 impinges on the tooth substance 101 of a tooth in the oral cavity and penetrates the tooth substance 101 and is remitted from the volume of the tooth substance 101. This is a diffuse (non-directional) reflection of light, as opposed to regular directional reflection, which satisfies the law of reflection. Part of the light pattern 103 may also be reflected from the surface of the tooth substance 101.

During remission, elastic scattering of the irradiated light pattern 101 can occur, in which the wavelength of the light remains unchanged, or fluorescence emission occurs, in which the wavelength of the light pattern 101 is changed by fluorescence transitions in the tooth substance 101. Fluorescence is the spontaneous emission of light shortly after the tooth substance is excited by light. In this process, the emitted photons are generally lower in energy than those previously absorbed. This is therefore inelastic scattering.

An optical detection device 111 is used to detect the light intensity of the light pattern 103 remitted from the volume of the tooth substance 101 or reflected on the surface. The detection device 111 comprises, for example, a digital camera with CCD or CMOS array, through which an image recording of the irradiated light pattern 101 can be obtained. The optical detection device 111 generates a data set representing the light pattern remitted and/or reflected from the tooth substance 101. Depending on the number of spatial frequencies and light wavelengths used, the measurement may be performed in several 100 ms, for example. The angle between a direction 107-1 in which the light pattern 103 is irradiated and a direction 107-2 in which the light intensity of the light pattern 103 is detected may be, for example, between 0° and 45°.

Fluorescence is detected in the detection device 111, for example, by using filters to suppress elastic scattering by a CCD or CMOS camera.

In this case, a spatially resolved and depth-selective measurement of fluorescence in the volume of the tooth substance can be performed, such as a distribution of porphyrins, which enables further characterization of the initial caries. Here, a light pattern with e.g. blue or red light is irradiated and the backscattered radiation in the red or infrared range is detected.

A controller or determination device 113 comprising an electronic circuit is used to determine a demineralization of the tooth substance 101 based on the detected light intensity.

Figure 2:
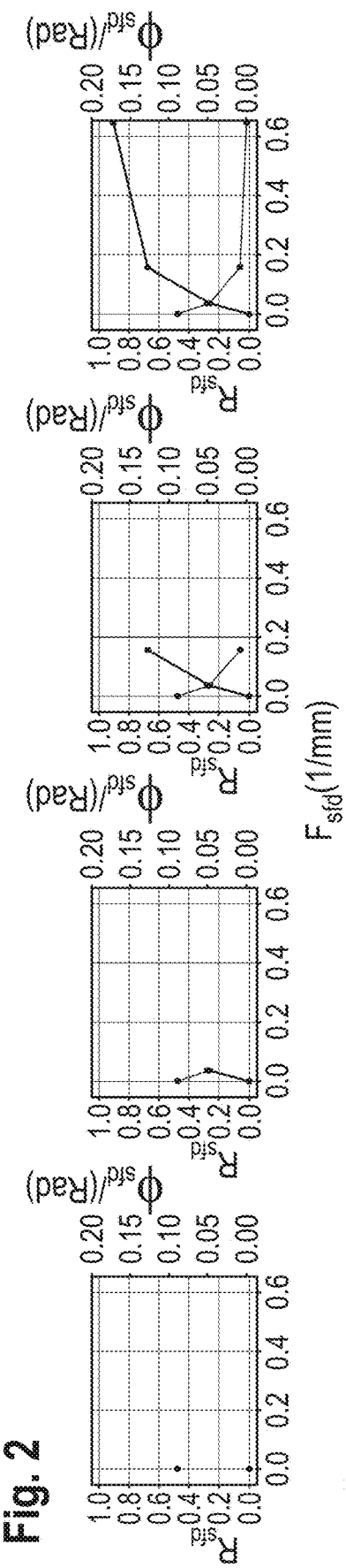
FIG. 2 shows a schematic view of different light patterns and phase shifts as they penetrate the tooth structure.
Figure 2:
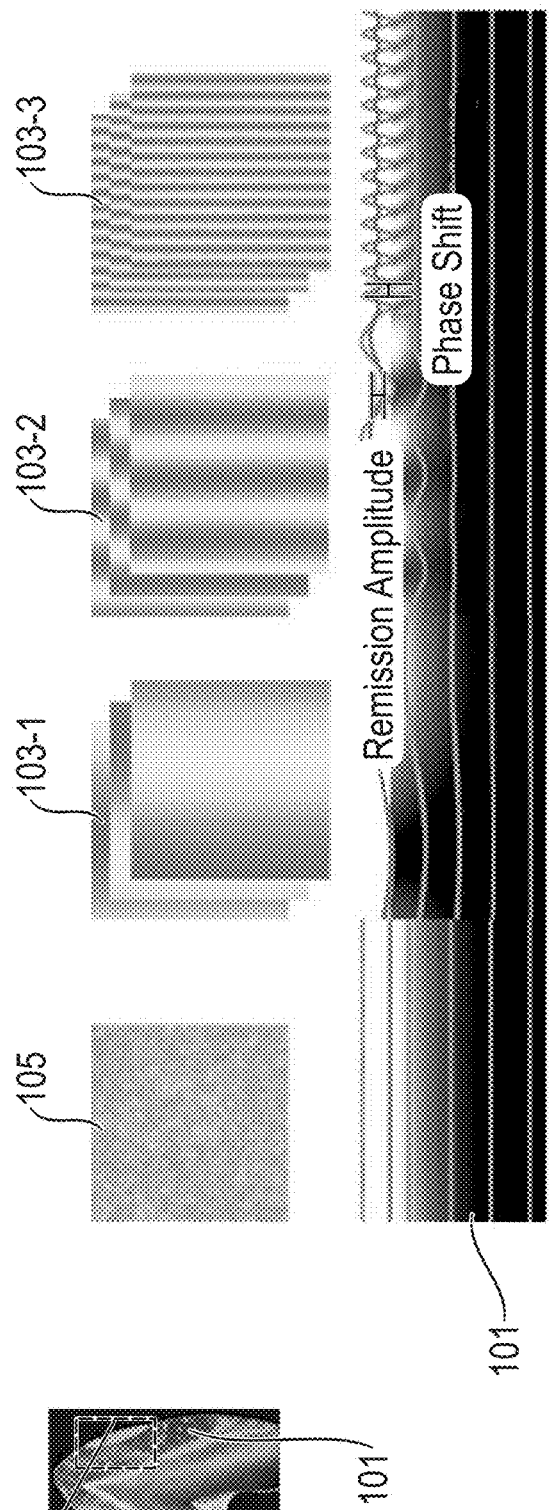
Figure 2:
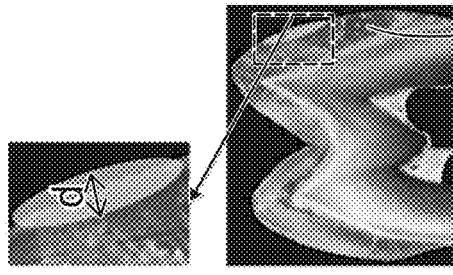

For this purpose, the determination device 113 comprises, for example, a digital processor and a digital memory, such as a random-access memory (RAM memory). Through these, the data set can be processed using an algorithm. By allowing the light pattern 103 to penetrate the volume of the tooth substance 101, the characteristics of the volume, such as demineralization in the case of caries, can be detected. For this purpose, the determination device 113 determines, for example, an intensity (intensity amplitude), wavelength shift (fluorescence) or local phase shift of the remitted light pattern relative to the irradiated light pattern 103. If these values deviate from those obtained for healthy tooth substance 101, demineralization can be inferred FIG. 2 shows different light patterns 103-1, . . . 103-3 and respective phase shifts when penetrating the tooth substance 101. No phase shift can be detected for a homogeneous light pattern 105 since this has no reference structures.

The light pattern 103-1 is a first light pattern with a first spatial frequency $F_{sfd}$. This is irradiated onto the tooth substance 101. The remitted light pattern 103-1 has a specific phase shift $\phi$ and a changed intensity amplitude $R_{sfd}$ compared to the irradiated light pattern.

The light pattern 103-2 is a second light pattern with a second spatial frequency $F_{sfd}$, which is higher than the first spatial frequency $F_{sfd}$. The remitted light pattern 103-2 also has a specific phase shift $\phi$ and changed intensity amplitude $R_{sfd}$ compared to the irradiated light pattern.

The light pattern 103-3 is a third light pattern with a third spatial frequency $F_{sfd}$, which is higher than the first and the second spatial frequency $F_{sfd}$. The remitted light pattern 103-3 also has a specific phase shift $\phi$ and changed intensity amplitude $R_{sfd}$ compared to the irradiated light pattern. In the examples shown, the intensity amplitude $R_{sfd}$ decreases the higher the spatial frequency $F_{sfd}$ of the light pattern 103, and the phase shift $\phi$ increases the higher the spatial frequency $F_{sfd}$ of the light pattern 103.

Depending on the degree of demineralization of the tooth substance, different values for the phase shift $\phi$ and intensity amplitude $R_{sfd}$ are measured as a function of the spatial frequency $F_{sfd}$. If these values deviate from those reference values obtained for healthy tooth substance 101, demineralization and lesion of tooth substance 101 can be concluded.

Figure 3:
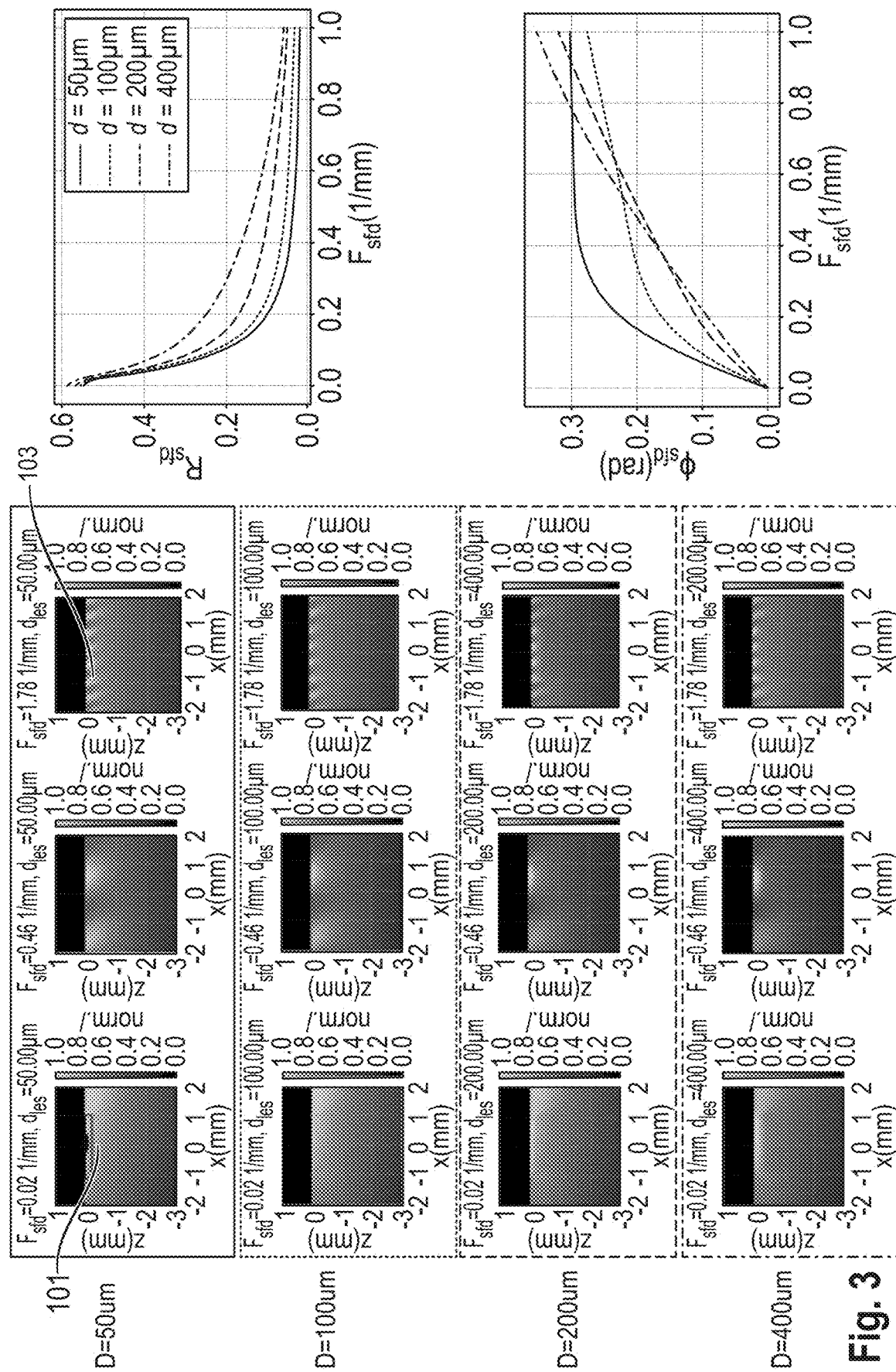
FIG. 3 shows different simulated cross-sectional views when different light patterns penetrate the tooth structure.

FIG. 3 shows different cross-sectional views when different light patterns 103 penetrate the tooth substance 101 on a modeled lesion. The signals are shown for different thicknesses of the tooth substance 101.

The measurement of the remitted light under structured illumination allows the spatially resolved determination of the remitted intensity amplitude $R_{sfd}$ and phase shift $\phi$. The remitted intensity amplitude $R_{sfd}$ and phase shift $\phi$ in the case of a lesion is generally influenced by its optical properties, the absorption coefficient $\mu_a$, the scattering coefficient $\mu_s$, the scattering phase function and the refractive index n, in particular by the optical transport thickness $\mu_s'*d$, where $\mu_s'$ corresponds to the effective scattering coefficient and d to the thickness of the lesion.

A lesion with a greater thickness d results in different curves of the remitted intensity amplitude $R_{sfd}$ and the phase shift $\phi$ as a function of the spatial frequency $F_{sfd}$. The light propagation in the tooth substance 101 is also dependent on the optical properties (absorption coefficient $\mu_a$, scattering coefficient $\mu_s$, scattering phase function and refractive index) of the tooth substance 101. The scattering coefficient $\mu_s$ is increased by initial demineralization relative to the healthy enamel. Modeling the light propagation based on the radiative transfer equation for layered media allows the thickness to be determined.

By means of a quantitative and spatially resolved measurement of the remitted and reflected intensity amplitude and phase shift in the spatial frequency domain, the quantities relevant for light propagation can be determined on the basis of a model by solving the radiative transfer theory, such as the effective scattering coefficient $\mu_s'$ and the absorption coefficient $\mu_a$. Here, the effective scattering coefficient $\mu_s'$ correlates with the degree of demineralization and the absorption coefficient $\mu_a$ with discoloration of the tooth. Both parameters can be measured and documented using the procedure.

Figure 4:
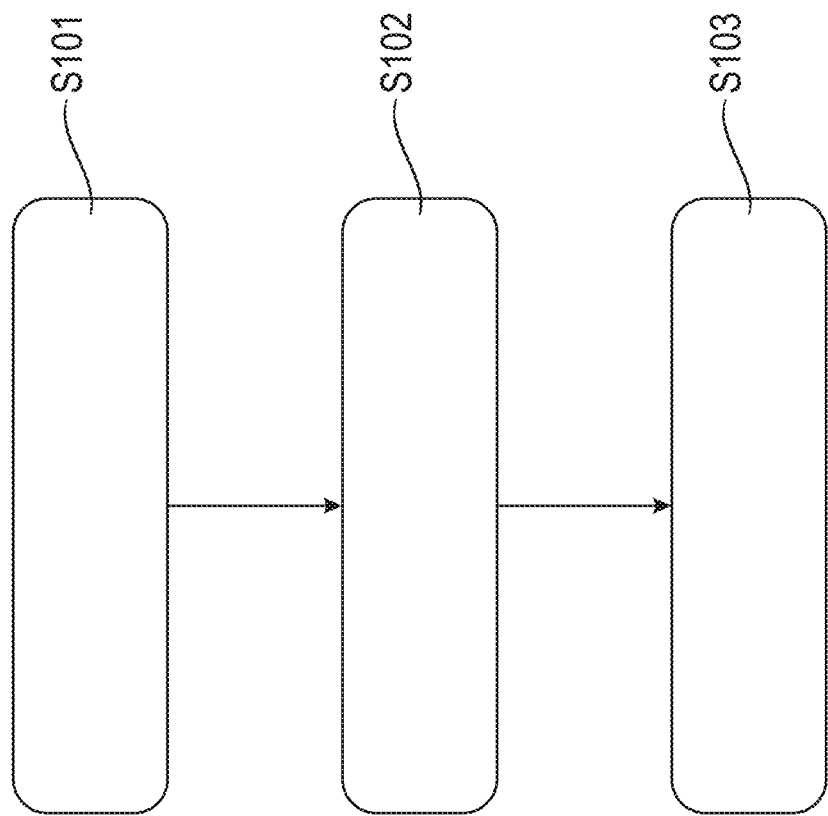
FIG. 4 shows a block diagram of the method for detecting demineralization of a tooth substance.

FIG. 4 shows a block diagram of the method for detecting demineralization of a tooth substance 101. In step S101, a structured light pattern 103 is irradiated onto the tooth substance 101. In step S102, the light intensity of the light pattern 103 remitted from the volume of the tooth substance 101 is detected. In step S103, a demineralization of the tooth substance 101 is determined based on the detected light intensity. For this purpose, a comparison of the remitted light intensity with a reference value is performed. In addition to the light intensity, the phase shift $\phi$ between the irradiated light pattern and the remitted light pattern can be determined. Also, in this case, a comparison of the phase shift $\phi$ with a reference value can be performed.

The method provides a sensitive, objective and quantitative three-dimensional measurement of the degree of (de)mineralization of the tooth substance 101. For this purpose, for example, a strip light method (structured illumination imaging) is extended in such a way that information is also obtained from the depth (volume) of the tooth substance 101. In this case, the tooth substance 101 can be illuminated with a monochromatic, structured light pattern, for example in the blue spectral range, such as a sinusoidal pattern of different spatial frequency.

The light remitted and reflected from the volume and surface of the tooth substance 101 is recorded by the camera. From the data set, the amplitudes and phase images can be calculated by suitable algorithms, for example by N-phase projection or Fourier-based demodulation. Based on a calibration of the camera rays in combination with a phase encoding by the active illumination, the tooth topography can be calculated from the camera image (3D scan). In addition, using the reconstructed 3D tooth topography, a volumetric intensity calibration can be performed so that quantifiable amplitude images can be generated in addition to the previously used phase images. Thus, depending on the irradiated spatial frequency, i.e. the strip frequency, the remitted and reflected intensity amplitude can be determined in each image point. This corresponds to the optical transfer function of the tooth substance 101, which depends on the microstructure. The microstructure causes the light scattering and, in addition to the chromophores, the tooth staining of the tooth substance 101. As the tooth substance 101 becomes more porous in the case of caries, this can be detected by changing the light scattering. A change and depth of the microstructure can be quantified on a model basis using the optical transfer function.

Demineralization based on this dataset can be determined either model-based or using AI-driven methods or multivariate classification methods. For these methods, a model-based calculation of the optical transfer function is performed to create a classifier. The method allows a quantifiable measurement of the remitted intensity amplitude and reflectance at any geometry of the tooth structure 101.

All features explained and shown in connection with individual embodiments of the invention may be provided in different combinations in the subject matter of the invention to simultaneously realize their beneficial effects.

All process steps can be implemented by devices which are suitable for executing the respective process step. All functions that are executed by objective features can be a process step of a process.

In some embodiments, the present disclosure may be implemented using a system having a camera, a processor, an electronic data storage unit, and a display. The camera can be a standard camera, an infrared dot-projection detector, flood illuminator camera, structured-light three-dimensional scanner, standard infrared detector, ultrasonic imaging device, Doppler detector, or any other suitable visualization system capable of capturing information related to a patient's dentition. The processor can be a single processor having one or more cores, or a plurality of processors connected by a bus, network, or other data link. The electronic data storage unit can be any form of non-transitory computer-readable storage medium suitable for storing the data produced by the system. The display can be any display suitable for displaying a digital color or grayscale image.

In some embodiments, the camera, processor, electronic data storage unit, and digital display are components of a single device. The single device may be a smartphone, tablet, laptop computer, personal digital assistant, or other computing device.

In some embodiments, the processor is in communication over a network, which could be wired or wireless, with an external processor used for performing one or more calculation steps and/or a network-attached electronic data storage unit. In some embodiments, the present disclosure makes use of cloud computing to perform one or more calculations steps remotely and/or remote storage to enable the storage of data remotely for collaborative or remote analysis. In some embodiments, the system comprises a plurality of graphical user interfaces to permit multiple users to view or analyze the same data.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The scope of protection of the present invention is not limited by the features explained in the description or shown in the figures. Although the invention is illustrated above, partly with reference to some preferred embodiments, it must be understood that numerous modifications and combinations of different features of the embodiments can be made. All of these modifications lie within the scope of the appended claims.

REFERENCE LIST

100 Dental device
101 Tooth structure
103 Light pattern
105 Homogeneous lighting
107 Direction
109 Projector or Projection device
111 Detector or Detection device
113 Controller or Determination device

The invention claimed is:

1. A method of detecting demineralization of a tooth substance, comprising the steps of:
    irradiating, with a projector, a structured light pattern comprising a stripe pattern, a dot pattern or a grid pattern and/or a periodic structure onto the tooth substance;
    detecting, with a detector, intensity of remitted light of the structured light pattern and/or intensity amplitude ($R_{sfd}$) of the remitted light from a volume of the tooth substance, wherein the remitted light is a product of by elastic scattering;
    determining, with a controller, a demineralization of the tooth substance based on the detected intensity of the remitted light and/or the intensity amplitude ($R_{sfd}$) of the remitted light; and
    displaying on a display, with a controller, images of degree of demineralization of the volume of the tooth substance;
    wherein a spatial geometry of the demineralization of the tooth substance is determined by a modeled lesion from a plurality of remitted light patterns each having a different spatial frequency.

2. The method according to claim 1, wherein the structured light pattern comprises a plurality of structured light patterns with different spatial frequencies, which are irradiated onto the tooth substance.

3. The method according to claim 1, wherein the structured light pattern comprises a plurality of structured light patterns, each having a different light wavelength, which are irradiated onto the tooth substance.

4. The method according to claim 1, wherein the demineralization of the tooth substance is additionally determined by a phase shift ($\varphi_{sfd}$) between the irradiated structured light pattern and the remitted light.

5. The method according to claim 4, wherein the intensity amplitude ($R_{sfd}$) and the phase shift ($\varphi_{sfd}$) are determined by spatial resolution over an area range and the demineralization is quantified by spatial resolution or determined based on the area.

6. The method according to claim 1, wherein an angle between a direction in which the structured light pattern is irradiated and a direction in which the remitted light is detected is between 0° and 45°.

7. A dental device for detecting demineralization of a tooth substance, comprising:
    a projector for irradiating a structured light pattern onto the tooth substance, wherein the structured light pattern comprises a stripe pattern, a dot pattern or a grid pattern and/or a periodic structure;
    a detector for detecting intensity of remitted light of the structured light pattern and/or intensity amplitude (Rsfd) of the remitted light from a volume of the tooth substance, wherein the remitted light is a product of elastic scattering;
    a controller for determining a demineralization of the tooth substance based on the detected intensity of the remitted light and/or the intensity amplitude (Rsfd) of the remitted light; and
    a display for displaying images of degree of demineralization of the volume of the tooth substance, wherein a spatial geometry of the demineralization of the tooth substance is determined by a modeled lesion from a plurality of remitted light patterns each having a different spatial frequency.

8. The dental device according to claim 7, wherein the projector comprises a digital projector having a multispectral radiation source.

9. The dental device according to claim 7, wherein the detector comprises an electronic camera.

10. The dental device according to claim 7, wherein the controller is configured to determine a spatial geometry of the tooth substance based on the remitted and/or reflected light pattern.

* * * * *